United States Patent [19]

Williams

[11] 4,042,412

[45] Aug. 16, 1977

[54] HIGH SOLIDS CONTENT ACTIVE CLAY COATING FORMULATIONS AND METHODS FOR PRODUCING AND APPLYING THE SAME

[75] Inventor: Rodney E. Williams, Williamsville, N.Y.

[73] Assignee: Moore Business Forms, Inc., Niagara Falls, N.Y.

[21] Appl. No.: 588,800

[22] Filed: June 20, 1975

[51] Int. Cl.[2] .......................... C09C 1/42; B41M 5/22

[52] U.S. Cl. ................................ 106/306; 106/288 Q; 106/288 B; 106/72; 427/146; 428/330

[58] Field of Search ............... 106/306, 288 B, 288 Q, 106/72; 428/330; 427/146

[56] References Cited

U.S. PATENT DOCUMENTS

| | | | |
|---|---|---|---|
| 3,468,698 | 9/1969 | Pelletier et al. | 106/306 |
| 3,714,107 | 1/1973 | Smith | 106/72 |
| 3,753,761 | 8/1973 | Sugahara et al. | 427/146 |

*Primary Examiner*—Patrick P. Garvin
*Assistant Examiner*—J. V. Howard
*Attorney, Agent, or Firm*—Watson, Cole, Grindle & Watson

[57] ABSTRACT

Disclosed are high solids content bentonite clay coating formulations for use in the production of receiver sheets for carbonless copying systems. The formulations comprise an acid-leached bentonite-type clay and an inactive clayey material such as chalk or a mixture of chalk and kaolin. The formulations are effective for use in the "on machine" blade coating of a paper substrate to more efficiently produce receiver sheets for carbonless copy systems.

11 Claims, No Drawings

HIGH SOLIDS CONTENT ACTIVE CLAY COATING FORMULATIONS AND METHODS FOR PRODUCING AND APPLYING THE SAME

BACKGROUND OF THE INVENTION

1. Field of the Invention

The present invention relates to improved clay coating formulations having particular utility in the field of carbonless copying. The formulations of the present invention may be utilized, for example, in the production of self-marking impact papers of the transfer or manifolding type wherein a first marking ingredient is carried on one sheet of paper for reaction with a second marking ingredient normally carried on a mating sheet of paper. More particularly, the invention relates to the use of particular inactive clayey materials in combination with an active clay such as an acid-leached bentonite-type clay to facilitate the production therefrom of coating slurries having high solids contents whereby the same may be coated on paper using a blade-coater to present a so-called receiver sheet of a carbonless copying system. High solids content coating slurries facilitate the "on machine" production of receiver sheets as the paper itself is made, thereby providing a "one step" operation by eliminating a subsequent paper coating step.

2. Description of the Prior Art

Impact or pressure-sensitive carbonless transfer papers have recently come into wide usage in the United States and throughout the world. Ordinarily, such papers are printed and collated into manifolded sets capable of producing multiple copies. In this connection, pressure applied to the top sheet causes a corresponding mark on each of the other sheets of the manifolded set.

The top sheet of paper, upon which the impact or pressure is immediately applied, ordinarily has its back surface coated with microscopic capsules containing one of the reactive ingredients which produces a mark. A receiver sheet, placed in contact with such back face of the top sheet has its front surface coated with a material having a component reactive with the contents of the capsules so that when the capsules are ruptured upon impact by a stylus or machine key, the initially colorless or substantially colorless contents of the ruptured capsules spill out to contact and react with a coreactant therefor on the receiver sheet. Thus, a mark is formed on the receiver sheet corresponding to the mark impressed by the stylus or machine key.

In the art, impact transfer papers are designated by the terms CB, CFB and CF, which stand respectively for "coated back," "coated front and back" and "coated front." Thus, the CB sheet is usually the top sheet and the one on which the impact impression is directly made; the CFB sheets are the intermediate sheets, each of which also transmits the contents of ruptured capsules from its back surface to the front of the next succeeding sheet; and the CF sheet is the last sheet and is only coated on its front surface to have an image formed thereon. The CF sheet is not normally coated on its back surface as no further transfer is desired.

While it is customary to coat the capsules on the back surface and to coat the coreactant for the capsules' contents on the front surface of each sheet, this procedure could be reversed, if desired. With some prior art systems, coatings are not used at all and the coreactive ingredients are carried in the sheets themselves, or one may be carried in one of the sheets and the other may be carried as a surface coating. Further, the reactants may both comprise microencapsulated liquids. Patents illustrative of many of the various kinds of systems which may incorporate such co-reactive ingredients and which may be used in the production of manifolded transfer papers include, for example, U.S. Pat. Nos. 2,299,694 to Green, 2,712,507 to Green, 3,016,308 to Macaulay, 3,429,827 to Ruus and 3,720,534 to Macaulay et al.

Carbonless copying systems have enjoyed widespread usage for business records, printout paper for computers and so on, and a very considerable bulk of patent literature pertaining to the preparation of such materials has grown up starting from several early series of patents, U.S. Pat. Nos. 2,505,470 through 2,505,489; 2,348,364 through 2,348,366; and 2,550,467 through 2,550,473. All of these patents, in general, disclose pressure-sensitive record materials utilizing, in various physical associations or arrangements, a color-forming dye precursor compound, preferably colorless, selected from one of a number of chemical classes and contained in some kind of pressure-rupturable or pressure-releasable state, in conjunction with an image-developing sheet carrying solid particles of a material which is capable of reacting with the dye precursor to produce a visibly colored reaction product. The dye precursor and the reactive clay generally form the components of an electron-donor acceptor surface absorption chemical reaction, resulting, on contact, in a distinctly colored reaction product.

The most common variety of carbonless impact transfer paper, and the type with which the present invention is particularly useful, is the type illustrated, for example, in Green (U.S. Pat. No. 2,712,507) and Macaulay (U.S. Pat. No. 3,016,308) wherein microscopic capsules containing a liquid fill comprising a solution of an initially colorless chemically reactive color forming dye precursor are coated on the back surface of the sheet, and a dry coating of a co-reactant chemical for the dye precursor is coated on the front surface of a receiver sheet.

Many color precursors useful in connection with carbonless copying systems are known to those skilled in the art to which the present invention pertains. For example, specific reference is made to the color precursors mentioned in the patent to Phillips, Jr. et al., U.S. Pat. No. 3,455,721 and particularly to those listed in the paragraph bridging columns 5 and 6 thereof. Other color precursors are disclosed in U.S. Pat. Nos. 3,703,397 and 3,713,863 to Lin et al. These color precursor materials are capable of reacting with a receiver coating containing an acidic material such as the acid-leached bentonite-type clay disclosed in U.S. Pat. No. 3,963,852 to Baxter, the entirety of which is hereby specifically incorporated by reference.

Many of the color precursors disclosed in the patents referred to above, are capable of undergoing an acid-base type reaction with an acidic material. Other previously known color precursors are the spiro-dipyran compounds disclosed in the patent to Harbort, U.S. Pat. No. 3,293,060 with specific reference being made to the disclosure of the U.S. Pat. No. 3,293,060 patent extending from column 11, line 32 through column 12, line 21. The color precursors disclosed in the patents listed above are initially generally colorless and capable of becoming highly colored when brought into contact with an acidic layer such as an acid-leached bentonite-type clay. Other suitable color precursors are those described by Davis in his U.S. Pat. Nos. 3,193,404, 3,278,327 and 3,377,185.

Generally speaking, the color precursor materials are dissolved in a solvent and the solution is encapsulated in accordance with the procedures and processes described and disclosed by Macaulay (U.S. Pat. No. 3,016,308) and by Ruus (U.S. Pat. No. 3,429,827) mentioned above. Other processes for encapsulating color precursors are disclosed in U.S. Pat. Nos. 2,712,507 to Green and 3,578,605 to Baxter. In this connection, it should be mentioned that the exact nature of the capsule itself is in no manner critical to the present invention. Solvents known to be useful in connection with dissolving color precursors include chlorinated biphenyls, vegetable oils (caster oil, coconut oil, cotton seed oil, etc.), esters (dibutyl adipate, dibutyl phthalate, butyl benzyl adipate, benzyl octyl adipate, tricresyl phosphate, trioctyl phosphate, etc.), petroleum derivatives (petroleum spirits, kerosene, mineral oils, etc.), aromatic solvents (benzene, toluene, etc.), silicone oils, or combinations of the foregoing. Particularly useful are the alkylated naphthalene solvents disclosed in U.S. Pat. No. 3,805,463 to Konishi et al.

In the color forming systems outlined above, as will be appreciated by those skilled in the art, the microencapsulated color precursors are conventionally included in the back coatings of the sheets of carbonless copying manifolded sets. Further, it will be appreciated that the acidic (or receiver) coatings are generally utilized as front coatings with the color precursor material in a solvent therefor being transferred from an adjacent back coating to the front receiver coating upon rupture of the capsules which contain the color precursor material.

A significant problem which has particularly plagued this industry in the past, at least in those instances where it is desired to use receiver coatings comprising acid-leached bentonite clays, is that the physical characteristics of these materials are such that it has not been possible to produce high solids content slurries therefrom and accordingly prior coating processes have been inefficient. Moreover, it has not been possible, utilizing low solids content slurries of acid-leached bentonite clays, to effectively coat paper therewith at the linear speeds (approximately 1,500 feet per minute, or more) utilized during the manufacture of the paper itself, usually on a Fourdrinier machine. Thus, it has generally been necessary to coat carbonless-receiver sheets "off machine" in a separate operation, an inherently much less efficient and less economical method of manufacture because of the extra handling steps required. Expense is also added off machine when low solids slurries are coated as, for example, by air knife because of the extra drying requirement.

While chalks have been utilized in conjunction with various clays in the past, it has not previously been suggested that the same could somehow facilitate the production of high solid content coating slurries from acid-leached bentonite-type clay materials. For example, U.S. Pat. No. 3,468,698 utilizes a clay-calcium carbonate formulation for producing coated papers for offset printing which possess improved strength, smoothness, etc. U.S. Pat. No. 3,622,364 shows that the addition of calcium carbonate among other additives is effective in improving the color development effect in pressure-sensitive recording paper. U.S. Pat. No. 3,661,610 discloses the use of a mixed kaolin clay-calcium carbonate material for use in paper coating compositions, paints, rubbers, and plastic materials. The patent appears to be primarily concerned with the brightness properties of the coating composition. Finally, U.S. Pat. No. 3,753,761 discloses the addition of calcium carbonate-clay mixtures to improve the color development effect in pressure-sensitive paper. However, none of the above patents even remotely suggests the applicant's inventive contribution, that is, the use of chalk in a bentonite clay coating formulation whereby the solids content of the latter may be increased.

SUMMARY OF THE INVENTION

It is an object of the present invention to provide an improved clay coating formulation for carbonless copying systems.

It is another object of the present invention to provide an improved carbonless transfer system wherein the receiver sheet is coated with a high solids content bentonite clay coating slurry, whereby the slurry may be applied to the receiver sheet with a blade or roller coater.

It is a further object of the present invention to utilize a sufficiently high solids content bentonite-type clay coating slurry to facilitate the "on machine" coating of a paper substrate therewith. Thus, the bentonite clay coating is applied at the same time that the paper itself is made and, accordingly, the usual secondary coating by an air knife or the like may be avoided.

DESCRIPTION OF THE PREFERRED EMBODIMENTS

Pursuant to the present invention, it has been found that, if chalk, that is, calcium carbonate, is added to a bentonite clay coating composition for receiver sheets of pressure-sensitive copying systems, a high solids coating slurry may be obtained to thereby facilitate the "on machine" application of the slurry to the substrate whereby the paper is coated at the same time that it is made. Thus, the novel high solids content bentonite clay slurries of the present invention may be coated using, for example, blade or roller coating techniques instead of an air knife. This particular feature facilitates "on machine" coating operations.

The principal objective of "on machine" coating as facilitated by the high solids content clay slurries of the present invention is to avoid the cost of separately coating already manufactured base stock. In "on machine" coating, the clay slurry is coated onto the paper as the paper is being manufactured. In making high solids content clay coatings for "on machine" application, the provision of specific properties is generally desirable. A total solids content of about 40–60% by weight and a viscosity in the range of, for example, about 700–7,000 cps (20 RPM Brookfield), have been found to be generally acceptable. The high solids content of the clay slurry facilitates drying of the coating whereby the aqueous phase may be readily removed. Both the high solids content and an appropriate viscosity are required to facilitate the provision of a proper coating weight at the high-speed operating condition of the typical Fourdrinier machine, that is, about 1,500 fpm or more.

In the past, it has been very difficult to provide high solids content slurries of acid-leached bentonite-type clay or the like. At solids contents well below those required for blade coating and drying at a linear speed of 1,500 fpm, the slurries become as thick as paste. It has been found that this problem can be at least partially overcome by adding a diluent clayey material of such a character that high total solids contents are possible. However, when a diluent clay, such as, for example, kaolin is used in sufficient quantities to provide an appropriate viscosity, it has been often found that the imaging capability of the active clay in the coating on the receiver sheet was reduced. Some of this lost imaging capability could be restored by reducing the quantity of binder in the coating but this sometimes reduced printability because when the quantity of binder is insufficient, the clay picks off the paper during printing with a concomitant loss of print quality.

According to the present invention, it has been discovered that chalk may be used in combination with the active clay to provide a high solids content coating slurry which may be applied "on machine," and which also provides a coating having appropriate imaging characteristics and resistance to picking. In this connection, it is theorized that the calcium carbonate acts as a separator between active clay particles in the coating so that the packing between active bentonite clay particles is reduced. This allows the maximum reactive clay surface to be accessible when the coating is contacted with a dye precursor and solvent in the usual manner during carbonless copying operations.

It has been noticed that when chalk is used in high solids content active clay coating formulations, it is often desirable to control the pH during the preparation of the formulation. Thus, before the chalk is added to the active bentonite clay slurry, the pH of the latter should preferably be adjusted to about 7 to 8. Generally, the active clay slurry itself is slightly acidic so this adjustment may be made by adding a base such as ammonia or the like. If this is done, the dispersion will remain fluid and agglomeration will not occur.

According to the present invention, the improved high solids content clay slurry formulation for use in preparing carbonless copying system receiver sheets comprises a mixture of an active clay such as an acid-leached bentonite-type clay and an inactive clayey material which is either chalk or a mixture of chalk and kaolin. The inactive clayey material is present in the formulation in an amount sufficient to produce a total solids content in the slurry in the range of from about 43 to 60% by weight and a viscosity of from about 700 to 7,000 cps. While the use of a chalk-kaolin mixture as the diluent in the coating formulation facilitates "on machine" application of the slurry, the presence of chalk in predominant amounts as the inert clayey material rather than kaolin provides a final coating having substantially improved imaging characteristics.

The active clays with which the present invention finds use include montmorillonite or. bentonite-type clays and particularly are the acid-leached bentonite-type clays described in U.S. Pat. No. 3,963,852 referred to above.

The inactive clayey materials which can be utilized in the present invention include kaolinites and chalk. The chalk can be a natural whiting, ground marble or calcite or a chemically-precipitated calcium carbonate material. Advantageously, Albaglos precipitated calcium carbonate may be used. Other diluents such as colloidal silica, fine silica powder, hydrated aluminum, aluminum oxide, plastic pigments, e.g., styrene-butadiene copolymers, etc., are also effective for improving the imaging characteristics of high solids content clay slurries.

The proportion of inactive clayey material present in the solids portion of the slurry formulation preferably should be sufficient to facilitate the preparation of aqueous slurries containing at least 43% by weight solids. Preferably, the solids content of the slurry will be at least 44% but not more than 60% by weight. To achieve such high solids content, the solids portion may contain from about 10 to about 90 parts by weight inert clayey materials and correspondingly 90 to 10 parts by weight active clay. More preferably, however, the solids portion should contain from 25 to 45 parts by weight inert clayey materials and correspondingly 75 to 55 parts by weight active clay. The inert clayey material itself preferably comprises from about 12.5 to 100% by weight chalk with the remainder preferably comprising kaolin. The solids portion of the particularly preferred formulation contains active clay and chalk in a ratio of 60 to 40.

In the process for making the high solids content slurry formulations of the present invention, the active clay and inactive clayey materials are slurried in water and after the resulting slurry is milled or otherwise thoroughly dispersed, a suitable binder is added to the slurry in an amount sufficient to provide a pick resistant final coating. Many suitable binders are known to those skilled in this art and Penford Gums such as those disclosed in U.S. Pat. Nos. 2,516,632-3-4 have been found to be acceptable. Generally, starches which have been modified by enzyme conversion or chemical treatment are useful as are casein, polyvinyl alcohol and synthetic latex emulsions containing styrene-butadiene or acrylic resins. Generally, the amount of dry binder will be approximately 15 to 30 parts by weight for each 100 parts by weight of the total solids content not including the binder.

The present invention is described more specifically in the following examples which are merely exemplary in nature and are not to be considered as being limitative of the present invention.

EXAMPLE 1

A high solids content active clay coating slurry suitable for "on machine" blade application was made according to the following procedure. 165 grams of water was poured into a beaker equipped with a stirrer and 4.05 grams of Calgon were added to the water which was then stirred until the Calgon was dissolved. 81.0 grams of acid-activated bentonite clay was then added to the beaker while stirring was continued and ammonia was added to the resulting slurry to adjust the pH of the latter to within the range of from about 7.0 to 8.0. 54.0 grams of Albaglos chalk was then stirred into the slurry of active clay and the mixture was then milled in a porcelain jar mill for about 2 hours at about 58–60 rpm. The weight ratio of dry active clay to the Albaglos chalk was 60 to 40. The milled slurry was then decanted into a Waring blender jar and an aqueous solution containing 30% by weight type 380 PG starch (cooked at 95° C for about 15 to 30 minutes) was dispersed therein in an amount calculated to provide 10 dry parts by weight starch for each 100 parts of dry solids not including the binder. After the starch was completely mixed in, an aqueous emulsion containing 50% by weight of a butadiene-styrene latex was stirred into the slurry as required to produce a viscosity of approximately 750 cps, 30 rpm Brookfield. The total dry solids content of the slurry including active clay, chalk and binder materials is about 44.4% by weight and the breakdown of the various constituents is shown in Table I below:

Table I

| Item | Dry | Wet |
|---|---|---|
| Water | — | 165.0 |
| Calgon | 4.05 | 4.05 |
| Acid-leached bentonite | 81.0 | 81.0 |
| Chalk (Albaglos) | 54.0 | 54.0 |
| Starch (30% solution by weight) | 13.5 | 45.0 |
| Latex (50% solution by weight) | 20.25 | 40.5 |
| TOTAL | 172.8 | 389.55 |

The above example, which was then repeated utilizing a 60/40 ratio of active bentonite clay to kaolin clay and a 60/20/20 ratio of active bentonite clay to kaolin to chalk. The results are tabulated below:

Table II

| Sample | 25 × 38 coating wt. | Image* Imm. | Image* 20 min. | Viscosity cps. |
|---|---|---|---|---|
| kaolin | 5.2 | 61.1 | 59.4 | 4,100 |
| kaolin + chalk | 5.3 | 51.4 | 49.1 | 5,400 |
| chalk | 4.5 | 49.7 | 47.9 | 5,000 |

*Image per cent reflectance readings are determined using aBNL-2 opacimeter manufactured by Diano Corporation. An unimaged area of the CF coated paper is backed with the BNL-2 white body and calibrated as 100. The reflectance of the image area relative to this standard is taken by then placing the imaged area in the measuring zone and backed by the white body. The reflectance value thus obtained is the ratio of the image to the background.

Table II reveals that when chalk was used predominately as the "inert" clayey material rather than kaolin, the final coating had far better image intensity. However, the pH of the active clay slurry had to be adjusted to between about 7.0–8.0 to prevent severe thickening.

EXAMPLE 2

An "on machine" coating operation was conducted utilizing a slurry prepared generally in accordance with the procedure of Example 1. The "on machine" runnability of the formulation was very good and samples of the coated sheets were tested for their imaging properties which were found to be generally acceptable.

The images were within the required specifications. The write-off had a blue color and none of the red usually seen in the imaging of air knife coated paper was visible to the naked eye. Also, the rub-off looked good, which indicated satisfactory printability.

EXAMPLE 3

Two acid-leached, bentonite clay, high solids content formulations prepared generally in accordance with the procedures outlined in Example 1 were blade coated on a paper substrate. The dry compositions of the two formulations are set forth in Table III and varied only in the binder which was utilized. Sufficient water was included such that the total solids content of each formulation was approximately 44% by weight.

Table III

| Item | Formulation No. 1 | Formulation No. 2 |
|---|---|---|
| Calgon | 5 | 5 |
| Bentonite Clay | 60 | 60 |
| Calcium Carbonate | 40 | 40 |
| Latex | 22 | 15 |
| Starch 380 PG | — | 10 |

Sufficient paper was coated with each of these formulations to conduct a printing trial. Sheets coated with each formulation provided excellent image intensity characteristics. The runnability of each of the formulations was rated very good at a speed of 1,500 fpm using a drying oven temperature of about 335° F. Formulation No. 2 had a slight edge in runnability, but both were considered very good.

The above data shows that the high solids content formulations of the present invention may be effectively blade coated "on machine" at normal machine operating speeds. Thus, the additional coating step normally associated with the making of carbonless copying receiver sheets is eliminated because the receiver sheets can now be made in a "one-step" operation simultaneously with the manufacture of the paper base stock itself.

I claim:

1. A coatable formulation comprising water, an active bentonite-type clay, an inactive clayey material selected from the group consisting of chalk and mixtures of chalk and kaolin and a binder, said inactive clayey material being present in the formulation in an amount sufficient to provide a total solids content in the formulation of from about 43 to about 60% by weight and a viscosity of from about 700 to about 7,000 cps.

2. The formulation of claim 1 wherein the chalk is chemically precipitated calcium carbonate.

3. The formulation of claim 1 wherein the weight ratio of active bentonite clay to inactive clayey material in the formulation ranges from about 10:90 to about 90:10.

4. The formulation of claim 3 wherein chalk is present in the clayey material in an amount ranging from about 12.5 to 100% by weight and kaolin is present therein in an amount ranging from 0 to about 87.5% by weight, based on the total weight of the clayey material.

5. A method of preparing a high solids content bentonite clay slurry comprising admixing water, an active bentonite-type clay, an inactive clayey material selected from the group consisting of chalk and mixtures of chalk and kaolin and a binder, said inactive clayey material being included in an amount sufficient to present a slurry having a total solids content of from about 43 to about 60% by weight and a viscosity of about 700 to about 7,000 cps.

6. The method of claim 5 wherein the active bentonite-type clay is first slurried with water, the pH of the clay slurry is then adjusted within the range of from about 7 to 8, and then the inactive clayey material is added to the bentonite-type clay slurry.

7. The method of claim 6 wherein the weight ratio of active bentonite-type clay to inactive clayey material in the slurry ranges from about 10:90 to about 90:10.

8. The method of claim 7 wherein chalk is present the clayey material in an amount ranging from about 12.5 to 100% by weight and kaolin is present therein in an amount ranging from 0 to about 87.5% by weight, based on the total weight of the clayey material.

9. The method of claim 6 wherein the slurry of active bentonite-type clay and inactive clayey material is subjected to milling.

10. The formulation of claim 1 wherein the weight ratio of active bentonite clay to inactive clayey material in the formulation ranges fom about 75:25 to about 55:45.

11. The method of claim 6 wherein the weight ratio of active bentonite-type clay to inactive clayey material in the slurry ranges from about 75:25 to about 55:45.

* * * * *